(12) United States Patent
Sharplin et al.

(10) Patent No.: US 8,452,688 B1
(45) Date of Patent: May 28, 2013

(54) DYNAMIC DEMAND AGGREGATION

(75) Inventors: Dan Sharplin, Austin, TX (US); Colin Bester, Dripping Springs, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 978 days.

(21) Appl. No.: 12/163,632

(22) Filed: Jun. 27, 2008

Related U.S. Application Data

(60) Provisional application No. 60/946,601, filed on Jun. 27, 2007.

(51) Int. Cl.
G06Q 30/06 (2012.01)
G06Q 50/06 (2012.01)
G06Q 30/0605 (2006.01)
G06Q 2050/0017 (2006.01)

(52) U.S. Cl.
USPC .......................................................... 705/37

(58) Field of Classification Search
CPC ..... G06Q 30/06; G06Q 50/06; G06Q 30/0605; G06Q 2050/0017
USPC ............................................................ 705/37
See application file for complete search history.

(56) References Cited

U.S. PATENT DOCUMENTS

| 7,177,728 | B2 * | 2/2007 | Gardner | 700/295 |
|---|---|---|---|---|
| 7,541,941 | B2 * | 6/2009 | Bogolea et al. | 340/870.02 |
| 2007/0043477 | A1 * | 2/2007 | Ehlers et al. | 700/276 |
| 2009/0240381 | A1 * | 9/2009 | Lane | 700/296 |

* cited by examiner

*Primary Examiner* — Daniel Felten
*Assistant Examiner* — Clifford Madamba

(57) ABSTRACT

A method and system for dynamic demand aggregation at one or more grouped sites wherein each grouped site includes one or more devices. Within each group, each device is in communication with one of more local controllers which, in turn, are in communication with an aggregator and the demand response repository. The local controller controls and coordinates the operation of the devices based on instructions received from the aggregator. The aggregator dynamically receives information from the demand response repository which is continuously updated with information from the signal handler and the local controllers at the grouped sites.

19 Claims, 2 Drawing Sheets

DYNAMIC DEMAND AGGREGATION

CROSS-REFERENCE TO RELATED APPLICATIONS

This non-provisional application claims priority based upon prior U.S. Provisional Patent Application Ser. No. 60/946,601 filed Jun. 27, 2007, entitled "Dynamic Demand Aggregation," the disclosure of which is fully incorporated herein, in its entirety, by this reference.

FIELD OF THE INVENTION

The present invention relates to a method and system for energy management. More specifically, but not by way of limitation, the present invention relates to a method and system for dynamic demand aggregation based on dynamically providing instructions to grouped sites and/or devices based on information in a demand response repository.

BRIEF SUMMARY OF THE INVENTION

A representative embodiment of the present invention includes a method and system associated signals received from third parties into a demand response repository for aggregated demand monitoring and control. An aggregator reads a request for a demand response event, determines the viability of fulfilling the request, acknowledges the request, and dynamically assigns the demand response task to the relevant aggregation group. Rule sets may be imposed on the aggregator so that, for example, disruption of the business or the financial impact to the business may be minimized. The system may generate reports and/or make the information regarding the demand responses available through the Internet.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
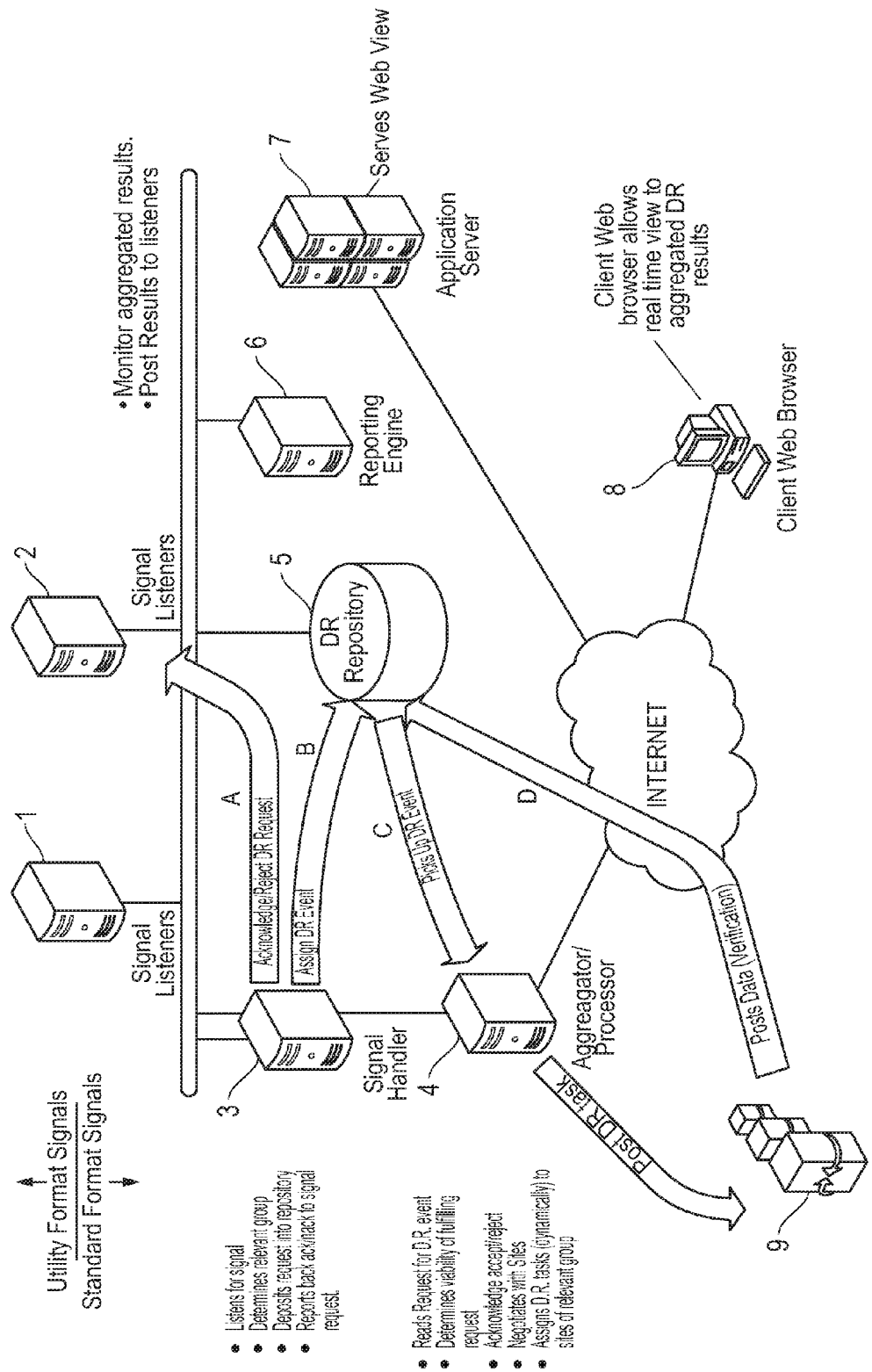
FIG. 1 shows a graphical depiction of the flow between hardware components of one embodiment of the present invention.

The present invention is directed to a method and system for managing the use of resources at one or more grouped sites 9. While the invention is applicable to the management of resources in general, it is particularly relevant to the reduction in demand for electricity in response to a demand response event. However, it should be noted that, at times, it may be valuable or necessary to increase consumption at one or more sites while decreasing consumption at other sites to most effectively allocate resources within an overall demand response. It should also be noted that a demand response request may relate to a past, current or future event.

In the present invention, each grouped site 9 includes one or more devices such as generators, air handlers, compressors, pumps, HVAC units, temperature control units, lights, equipment, etc. Within each group, each device is communicatively coupled with one of more local controllers which, in turn, are communicatively coupled to the aggregator 4 and the demand response repository 5. The local controller controls and/or coordinates the operation of the devices based on instructions received from the aggregator 4. The aggregator 4 dynamically receives information from the demand response repository 5 which is continuously updated with information from the signal handler 4 and the local controllers at the grouped sites 9.

Referring now to FIG. 1, two signal listeners 1 and 2 receive notifications of, or otherwise detect, events from various sources such as, for example, the electric power distribution grid, grid owners and operators, fuel providers, or other sources with information relevant to the applicable utility. The signal may be received in a variety of formats. In fact, different utilities can use vastly different methods and formats. For example, the format of the signal may be XML SOAP, an email, a telephone call, a page directed to a pager, or another format. The signal listeners 1 and 2 of the present invention are able to receive and respond to each of these different formats. In one embodiment of the present invention, the signal listeners 1 and 2 convert the format of the signal from the format in which it was received into a standardized format before sending the signal to the signal handler 3. As a result, all signals acquired in the present system can be managed in a standardized format.

In one embodiment, the signals received by the signal listeners 1 and 2 are demand response requests. In electricity grids, demand response refers to methods for managing the demand from customers in response to supply conditions, for example, having electricity customers reduce their consumption at times of high usage or high market prices. In a typical load shedding scenario, services are reduced during the critical timeframes. The signal may be a global signal for the overall reduction of power or could be designated for one or more grouped sites. Under conditions of tight electricity supply, demand response can significantly reduce the peak price and, in general, electricity price volatility.

The signal listeners 1 and 2 pass the signal on to the signal handler 3, either directly or through a signal event queue. The signal handler 3 then determines whether a response is required. The decision as to whether to respond will be based on a case-by-case basis and may be based on, for example, geographic location, the utility making the request, time of day, etc. In some circumstances, the size of the group can be an important factor because the larger the group, the larger the demand upon which the system can draw. In those cases where a response is required, the signal handler 3 evaluates what resources are available and then sends a signal back acknowledging the demand response request.

The signal handler 3 passes the demand response request to the demand response repository 5. The demand response repository 5 includes a database capable of storing information regarding, among other things, each demand response request.

The aggregator 4 is in communicative contact (including, in one embodiment, through one or more demand pollers) with one or more local controllers at each grouped site 9. The aggregator 4 reads the demand response request from the demand response aggregator 5. If the demand response request requires actions by one or more devices in a grouped site 9, the aggregator 4 executes the demand response.

The aggregator 4 will evaluate potential options for the demand response and respond accordingly. The aggregator 4 may use certain rule sets programmed by the administrator to evaluate the available options. For example, each grouped site 9 may have different rule sets regarding reducing aggregate load, reducing peak load, reducing cost during off-peak hours, etc. Variables that may be important in establishing the rule sets include, among others, periods of building use, asset operation and maintenance cost, weather data, existing service and rate contracts. The rule sets may be set in advance or may change dynamically. For example, one site may not want to exceed a certain demand. Another site may be interested in taking advantage of discounted rates at off-peak hours and may be interested in voluntarily feeding peak hour allocations back into the system in exchange for off-peak hours.

The aggregator 4 queries each grouped site 9 to determine if demand reduction is available and, if so, at what cost. The aggregator 4 then applies the information received from the grouped sites and applies it against the rule sets to assign demand reduction tasks to one or more grouped sites 9. For example, if the aggregator 4 has 200 sites under its control and receives a demand response request to shed 1 megawatt, the aggregator 4 will determine a preferred method to shed the load while minimizing disruption to each of the grouped sites 9. While traditional systems typically shed the load on a uniform basis across all users, the system of the present invention determines which site will suffer the least disruption by shedding load and responds accordingly.

In one embodiment of the present invention, all demand responses held in the demand response repository 5 may be accessed concurrently so as to avoid the requirement that all demand responses be processed in a sequential manner. The signal listeners 1 and 2 are monitoring signals and, as demand responses are received and processed through the signal handler 3 to the demand response repository 5, the aggregator continues to respond to sites dynamically, that is, based on new information flowing into the demand response repository 5. For example, based on information received from the signal listeners 1 and 2, the aggregator 4 may initially choose to shift a load away from grouped site 9 but, after receiving additional information from the signal listeners 1 and 2, the aggregator 4 may elect to shift load back to that same grouped site 9.

The aggregator 4 continuously monitors the demand response repository 5 and adjusts the demand reduction tasks accordingly. It is important to recognize that the aggregator 4 provides the assigned tasks to the grouped sites 9 but that information from the grouped sites 9, such as post-data verification, flows directly back to the demand response repository 5. As a result, information regarding the site status is continuously being fed into the demand response repository 5 so that the aggregator 4 knows, for example, the present demand response, whether the demand has been reduced at any site, the amount of the aggregate load, etc.

A reporting engine 6 provides reports on the activities of the system and information is made available to users via a network, such as the Internet, through the application server 7. In general, most of the reporting will be based on information contained in the demand response repository 5. Because each of the signal generators use different formats for their signals (as discussed in more detail above), the reports must be generated back to the signal generators in formats that are useful to them.

Figure 2:
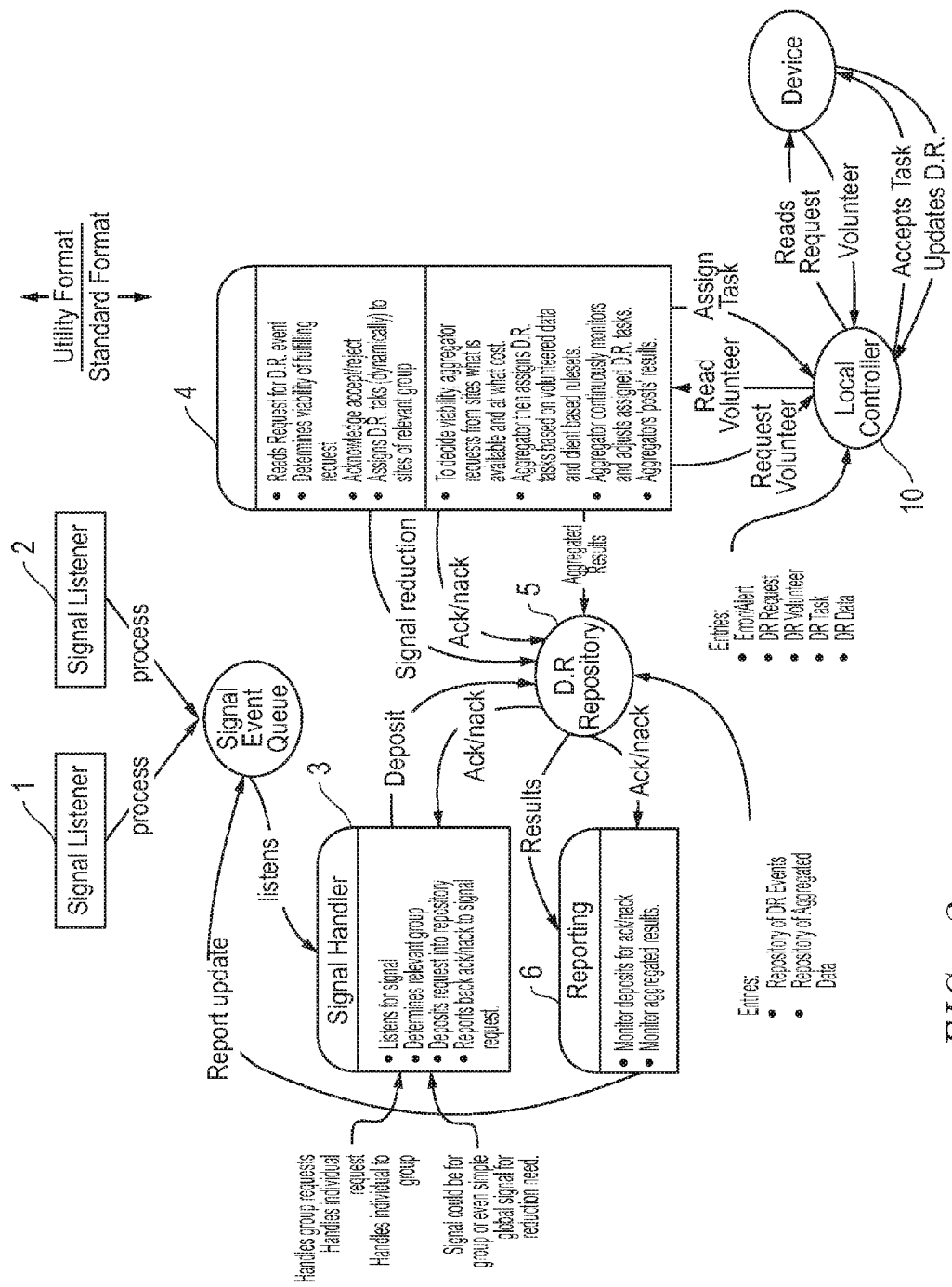
FIG. 2 shows an aggregation flow diagram of one embodiment of the present invention.

Referring now to FIG. 2. The signal listeners 1 and 2 process the signal through a signal event queue onto the signal handler 3. The signal handler 3 listens for signals from the signal event queue, determines the relevant group into which to place the signal, deposits the request into the demand response repository 5, and reports back to the signal listeners 1 and 2 as to whether the signal has been acknowledged or not acknowledged.

Information from the demand response repository 5 is processed by the aggregator 4. The aggregator 4 reads the request for the demand response event, determines the viability of fulfilling the request, acknowledges the accept or reject order, and assigns the demand response tasks dynamically to the relevant grouped sites 9. The aggregator 4 requests information from the local controller 10 to decide what is available from the sites and at what cost. The aggregator 4 then assigns the demand response tasks based on volunteered data in client-based rule sets. The aggregator 4 continuously monitors and adjusts assigned demand response tasks. In addition, the aggregator posts results to the demand response repository 5.

The local controller 10 interacts with the device to read requests and accept tasks as well as to update demand responses.

The demand response repository 5 provides results as well as acknowledge/non-acknowledge information to the reporting engine 6 and, in turn, the reporting engine 6 may provide report updates back to the signal event queue. It is important to note that there may be one or more signal listeners in the system and the types of signals which may be monitored are varied. In addition, the aggregator 4 may be one or more computers and may be located in one or more geographic locations. Importantly, the aggregator 4 may be comprised of multiple computers situated remotely but interconnected for purposes of processing information.

In one embodiment of the present invention, the demand responses may be distributed on an auction basis so that those sites bidding the highest amount for a portion of the load would be awarded the load preferentially. The demand responses could be allocated in any number of ways including on a timed basis, on a geographic basis or otherwise. In addition, elaborate business rules could be established by which certain sites could reduce demand during their peak hours or agree to purchase energy only at or below a rate which has been pre-designated. In addition, other rules may be implemented which serve to minimize disruption to each of the sites. By implementing certain business rules it is possible to mitigate the effects to each site on a controlled basis.

By way of example, in response to a demand response request for the reduction of power by a certain amount, the aggregator may determine that it is prudent to reduce power to certain sites which are operating in off-peak hours and to leave power as is, or even increase power as necessary, at other sites operating in peak hours, as long as the overall reduction in demand satisfies the demand response. The reduction in power to the affected sites may be performed incrementally so as to minimize disruption to the site.

In order to effectively assess the value of the system, it is necessary to establish a baseline upon which energy savings at a site may be compared. Without such a baseline, it would be difficult if not impossible to assess the savings generated by the system. Without the use of the system, one of the few reliable ways for assessing savings or demand reduction is by measuring demand on a non-demand response day and comparing those figures to the savings realized on a demand response day. Obviously, this approach has inherent drawbacks because of changes to times of operation, weather conditions, internal conditions, etc. In the present system, however, the system collects real time data from the site concerning each of the variables (e.g., external temperature, external humidity, internal temperature, etc.) and uses that information to establish a theoretical baseline against which demand response reduction can be calculated. By using actual information from the site it is possible to show actual savings, either financial or energy consumption, realized through use of the demand response system.

While the present system and method has been disclosed according to the preferred embodiment of the invention, those of ordinary skill in the art will understand that other embodiments have also been enabled. Even though the foregoing discussion has focused on particular embodiments, it is understood that other configurations are contemplated. In particular, even though the expressions "in one embodiment" or "in another embodiment" are used herein, these phrases are meant to generally reference embodiment possibilities and are not intended to limit the invention to those particular embodiment configurations. These terms may reference the same or different embodiments, and unless indicated otherwise, are combinable into aggregate embodiments. The terms "a", "an" and "the" mean "one or more" unless expressly specified otherwise.

When a single embodiment is described herein, it will be readily apparent that more than one embodiment may be used in place of a single embodiment. Similarly, where more than one embodiment is described herein, it will be readily apparent that a single embodiment may be substituted for that one device.

In light of the wide variety of possible aggregation models, the detailed embodiments are intended to be illustrative only and should not be taken as limiting the scope of the invention. Rather, what is claimed as the invention is all such modifications as may come within the spirit and scope of the following claims and equivalents thereto.

None of the description in this specification should be read as implying that any particular element, step or function is an essential element which must be included in the claim scope. The scope of the patented subject matter is defined only by the allowed claims and their equivalents. Unless explicitly recited, other aspects of the present invention as described in this specification do not limit the scope of the claims.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. Finally, in the foregoing discussion and in the claims, the terms "including" and "comprising" are used in an open-ended fashion, and thus should be interpreted to mean "including, but not limited to . . . ".

What is claimed is:

1. A computer-implemented method of demand aggregation, the method comprising:
    receiving, at a signal handler, a demand response request indicative of a demand response event corresponding to a demand reduction for a plurality of sites;
    inputting said demand response request into a demand response repository;
    creating rule sets at an aggregator;
    allocating the demand reduction to the plurality of sites based on said demand response request, said rule sets, and an auction process for demand during the demand response event, wherein a site of said plurality of sites with a higher bid for a portion of said demand in said auction process is allocated a lower share of the demand reduction;
    instructing, via a local controller, said plurality of sites to modify demand based on said allocating;
    providing information from said demand modification to said demand response repository; and
    dynamically monitoring, at said aggregator, said demand response repository to determine whether new demand response requests have been received.

2. The method of claim 1 wherein new modification instructions are provided via said aggregator to said plurality of sites when said new demand response requests have been received.

3. The method of claim 1 wherein said demand response request is received from an electric power grid.

4. The method of claim 1 wherein said demand response request is converted to a standardized format before inputting into said demand response repository.

5. The method of claim 1 wherein two or more of said demand response requests may be accessed simultaneously by the aggregator.

6. The method of claim 1 wherein said information from said demand modification is provided directly from said local controller to said demand response repository.

7. The method of claim 1 wherein allocating the demand reduction comprises allocating an increased load to one of said plurality of sites and allocating a decreased load to another of said plurality of sites.

8. The method of claim 1 wherein, in addition to providing information from said demand modification to said demand response repository, historical and real-time information regarding external temperature, external humidity, internal temperature, internal humidity, and carbon dioxide is provided to said demand response repository.

9. The method of claim 1 wherein creating the rule sets at the aggregator comprises creating rule sets for aggregate load reduction, peak load reduction, and off-peak cost reduction for each of the plurality of sites.

10. A system for demand aggregation comprising:
    an aggregator configured to implement one or more stored rule sets; and
    a demand response repository communicatively coupled with a signal handler, said aggregator, and one or more grouped sites,
    wherein each of said grouped sites includes one or more devices, and wherein said signal handler inputs demand response requests into said demand response repository, each demand response request indicative of a demand response event corresponding to a demand reduction for said sites, devices, or sites and devices, said aggregator allocates the demand reduction to said sites, devices, or sites and devices based on said demand response requests, said rule sets, and an auction process for demand during the demand response event, a site of said grouped sites, a device of said one or more devices, or both with a higher bid for a portion of said demand in said auction process being allocated a lower share of the demand reduction, said aggregator instructs said sites to modify demand based on the allocated shares of the demand reduction, said sites, devices, or sites and devices provides information from said demand modification to said demand response repository.

11. The system of claim 10 wherein said demand response repository is dynamically monitored to determine whether new demand response requests have been received.

12. The system of claim 10 wherein said demand response repository is dynamically monitored to determine whether new demand response requests have been received and wherein new modification instructions are provided to said sites, devices, or both when said new demand response requests have been received.

13. The system of claim 10 wherein said demand response request is received from an electric power grid.

14. The system of claim 10 wherein said demand response request is converted to a standardized format before inputting into said demand response repository.

15. The system of claim 10 wherein two or more of said demand response requests may be accessed simultaneously by said aggregator.

16. The system of claim 10 wherein said information from said demand modification is provided directly from a local controller to said demand response repository.

17. The method of claim 10 wherein said aggregator allocates an increased load to one of said sites, devices, or both and allocates a decreased load to another of said sites, devices, or both.

18. A computer-implemented method of demand aggregation comprising:
   receiving a demand response request at a signal handler, the demand response request indicative of a demand response event associated with a demand reduction for a plurality of sites;
   inputting said demand response request into a demand response repository;
   determining each site's interest in maintaining demand during the demand response event through an auction process;
   allocating, based on said auction process and the demand response event, the demand reduction to the plurality of sites, a lower share of the demand reduction being assigned to the sites of the plurality of the sites with higher bids for portions of said demand in said auction process;
   instructing, via a local controller, said sites to modify demand based on said allocating;
   providing information from said demand modification to said demand response repository; and
   dynamically monitoring, via an aggregator, said demand response repository to determine whether new demand response requests have been received.

19. The method of claim 9 wherein the rule sets are created based on building usage, asset operation and maintenance cost, weather data, and service and rate contracts for each of the plurality of sites.

* * * * *